United States Patent [19]
Gater et al.

[11] 4,454,839
[45] Jun. 19, 1984

[54] FURNACE

[75] Inventors: Roger A. Gater, Dover; Herbert D. Michelson, Ft. Lee, both of N.J.

[73] Assignee: Exxon Research & Engineering Co., Florham Park, N.J.

[21] Appl. No.: 404,430

[22] Filed: Aug. 2, 1982

[51] Int. Cl.³ .............................................. F22B 21/24
[52] U.S. Cl. ................... 122/333; 122/240 R; 122/356; 122/14; 122/6 A
[58] Field of Search ................ 122/10, 18, 19, 14, 122/210, 6 A, 235 R, 235 B, 235 P, 235 S, 235 T, 332, 333, 2 S, 240 R, 503, 356; 422/196, 204; 196/110; 431/8, 9, 115, 116

[56] References Cited

U.S. PATENT DOCUMENTS

| | | |
|---|---|---|
| 1,823,117 | 9/1931 | Murray et al. |
| 2,076,871 | 4/1937 | Watts ........................ 196/116 |
| 2,079,191 | 5/1937 | Thomas ..................... 196/116 |
| 2,090,907 | 8/1937 | Wilson ...................... 196/110 |
| 2,173,984 | 9/1939 | Shapleigh ............... 122/333 X |
| 2,220,387 | 11/1940 | Baker ....................... 196/116 |
| 2,224,827 | 12/1940 | Mathews ................... 196/110 |
| 2,914,386 | 11/1959 | Shapleigh ............... 422/204 X |
| 2,939,434 | 6/1960 | Steinert ................... 122/235 P |
| 3,274,978 | 9/1966 | Palchik et al. ............ 196/110 |
| 3,406,804 | 10/1968 | Breckenridge ............ 196/98 |
| 3,450,506 | 6/1969 | Guerrieri .................. 23/288 |
| 3,573,012 | 3/1971 | Kitzen et al. ............. 48/214 |
| 3,671,198 | 6/1972 | Wallace .................... 23/277 |
| 3,672,847 | 6/1972 | Esselink .................... 23/288 |
| 3,841,274 | 10/1974 | Barnes .................. 122/333 X |

FOREIGN PATENT DOCUMENTS 83300758.6  9/1983  European Pat. Off.

OTHER PUBLICATIONS

"Ethylene", *Chemical Week*, Nov. 13, 1965, pp. 69–81.

*Primary Examiner*—Henry C. Yuen
*Attorney, Agent, or Firm*—Rebecca Yablonsky

[57] ABSTRACT

A unique combustion system is described which improves the aerodynamic pattern associated with the combustion gases inside a pyrolysis furnace. The resultant pattern is very stable, creates minimum flame impingement on the process tubes, and ensures a very high mixing level throughout the reactor.

27 Claims, 11 Drawing Figures

FURNACE

This invention relates to a furnace having tubes and/or coils of tubes through which process fluids, i.e., fluids to be heated, are passed, in which improved heat distribution is achieved than heretofore. Such tubes may be vertical and essentially parallel, arranged in rows, and are heated primarily by the radiant heat from fuel/air fired burners and secondarily by convection from the hot combustion gases to the tubes. In conventionally fired furnaces problems still persist of the heat not being uniformly distributed and also of the impingement of the flames on the tubes, resulting in localized hot spots in the metal, which can cause non-uniform heating of the process stream and promote accelerated coking inside the tubes.

The present invention involves a concept of opposed combustion according to which a selection of arrangement/orientation of process tubes/burner jets in the combustion section of a furnace can effectively be used to obviate these problems. It aims to generate a stable, forced vortex of combustion gases which wraps around a bank of vertical tubes, thereby providing a more uniform heat distribution. The invention therefore relates to a particular orientation of vortices relative to the tubes. Opposed firing burners for accomplishing this purpose are employed and particular modes of location, firing direction, spacing and the like will be described.

The furnaces contemplated may be used for various hydrocarbon conversions such as the steam reforming of natural gas or light hydrocarbons by steam to hydrogen and carbon oxides, which is especially useful in ammonia plants; and particularly in steam cracking to convert petroleum fractions such as ethane up to naphtha and gas oil to lighter products, especially $C_2$–$C_4$ olefins, such as ethylene, and heavier. In steam cracking the feed is generally mixed with from about 20 to 92 mol % steam and heated to temperatures in the range of about 1300° to 1800° F. The furnace may also be a steam boiler or a process heater such as used in refineries to heat crude oil.

BACKGROUND OF THE INVENTION

U.S. Pat. No. 1,823,117 is directed to achieving a more complete combustion of the fuel in the combustion chamber of a steam boiler. Rows of vertical water tubes are located at the walls of a rectangular boiler. In the central portion, four circular whirling and ascending columns of burning gases are produced by placing the wall burner fuel nozzles so that the jet from one is deflected by the jet from another at right angles thereto and repeating this arrangement at intervals around the furnace walls. However, this patent is not directed to the problem of achieving uniform heat distribution over the tubes and the tubes are not enveloped by a vortex of hot combustion gases. Such deflecting of one jet by another jet is not characteristic of the present invention in which one jet reinforces and is drawn into another jet.

U.S. Pat. No. 3,671,198 shows in FIG. 4 vertical reaction tubes and burners in the floor and roof of a furnace but the balanced, symmetrical arrangement thereof and the narrowing of the combustion chamber in the midsection precludes the development of a vortex as envisioned in the present invention. It may also be viewed as two symmetrical furnaces with a central flue gas outlet. U.S. Pat. No. 3,573,012 also shows a symmetrical arrangement in a furnace having a plurality of straight tubes extending vertically through the combustion zone wherein the burners are located on the front and back walls of the furnace in a manner to direct heat at opposite faces of each tube without establishing any vortex.

U.S. Pat. No. 3,406,804 discloses a furnace chamber having a row of vertical reactor tubes extending through the chamber and between burners located in the side walls. Rows of burners, facing towards the center, are located opposite one another, although vertically displaced. Again no attempt at creating a vortex is made.

U.S. Pat. No. 3,450,506 requires an annular configuration of a steam reformer furnace in which process tubes extend vertically, with vertical rows of burners in the walls. Burners in rows on one side are placed opposite burners on another side and are staggered so that individual burners do not directly face each other. However, they do not create a vortex that engulfs the bank of tubes.

Although furnaces having horizontal tubes are not germane to this invention, U.S. Pat. No. 2,220,387 may be noted. It discloses a furnace with horizontal process tubes and burners firing horizontally, on opposite sides of the combustion chamber, wherein a burner on one side is not positioned directly opposite a burner on the opposite side but is slightly displaced therefrom either horizontally or vertically or both. However, as FIG. 2 clearly shows, the distance or offset between the center lines of the respective opposed burners is small, e.g., 8 inches, such that streams of gases coming from opposite sides just brush one another so as to avoid direct collision, but is insufficient to promote the formation of a vortex as contemplated in the present invention. It may further be noted that this patent involves a large number of small burners and relatively short flames, whereas the present invention contemplates flames or jets of combustion gases that may be as much as 20 to 40 feet long with each burner large in firing capacity.

Other U.S. Pat. Nos. of general interest are: 2,076,871 2,079,191, 2,090,907, 2,224,827, 3,672,847.

SUMMARY OF THE INVENTION

In this description, vertical tube refers to either a once-through vertical tube or a vertical segment of a tube which as a whole may have a different configuration such as U-shaped, serpentine, etc. The vertical tubes may be of the bent or bowed type as described in U.S. Ser. No. 301,763 filed Sept. 14, 1981. A cell designates a portion of a furnace having a single row of vertical, essentially parallel process tubes; alternatively the tubes in the row may be zigzag so as to form two staggered adjacent rows, referred to herein as a double row of tubes. A vertical tube plane is a plane passing through the vertical axes of a single row or through the center of such two staggered adjacent rows (double row) of vertical tubes. There is one cell per vertical tube plane and per vortex. Opposed firing burners denotes a row of burners firing in one direction and another row firing in the opposite direction. Generally, a row of burners refers to a row as a whole and not to individual members thereof. Combustion gases are gases at any stage of burning including completed combustion.

According to the invention, a furnace is provided comprising a radiant heating section which typically is six-sided, viz., of boxlike or rectangular shape, in which there is at least one cell having a single or double row of vertical process tubes defining a vertical tube plane, wherein there is a first row of burners firing in one direction and a second row of burners firing in the opposite direction, no row, however, being located directly opposite an opposed firing row, to cause a forced vortex of combustion gases around said tube plane. In fact, opposed firing rows are spaced or offset from one another a sufficient distance such as to promote development of the vortex from the streams of combustion gases flowing in opposite directions, viz., so that the gas streams neither collide head on nor brush one another but rather cooperate to allow a circulatory or whirling motion to develop. The combustion section may comprise two or more cells and may have a full or partial baffle between them which helps to stabilize the vortices.

Said first row of burners may be at one side or along one side of the vertical tube plane and said second row of burners may be at the other side or along the other side of said tube plane. Generally, the burners are of the long, narrow flame type. Typically the vortex will have a substantially elliptical shape.

In one embodiment, with vertical tubes, the opposed firing burners all fire vertically and may be located in the top, bottom or side walls of the furnace, the offset distance being horizontal.

In another embodiment, with vertical tubes, the opposed firing burners all fire horizontally and are located in the end walls of the furnace, the offset distance being horizontal.

The furnace further comprises a convection section which may be located alongside of, or on top of, the radiant heating section.

BRIEF DESCRIPTION OF THE DRAWINGS

The following detailed description of the present invention may be more readily understood by reference to the drawings in which like numbers are used to refer to like parts, wherein:

FIG. 5 is an isometric view of a furnace in which the furnace tubes are U-shaped, the burners fire horizontally and are situated in the end walls of the combustion section, with a convection section adjacent thereto which alternatively could be located on top of the furnace, as shown in FIG. 5a.

DETAILED DESCRIPTION

Figure 1A:
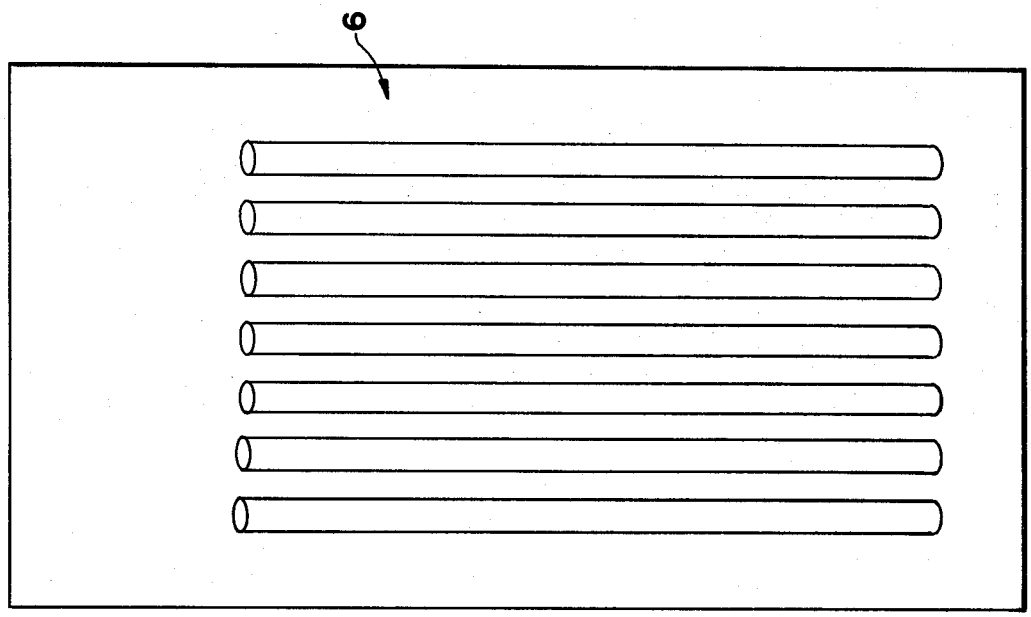
FIG. 1a is a side view of FIG. 1, showing a row of once-through vertical tubes, broken away.

The aerodynamics associated with combustion inside a cracking furnace have now been shown by actual tests in a furnace and by simulations to have a significant effect on the heat release pattern throughout the furnace. For example, it is not uncommon to change individual tube-metal temperatures as much as 100° F., or more, by just changing the aerodynamic pattern in the furnace. A desirable aerodynamic pattern is one which is stable, causes minimum flame impingement on the process tubes, and creates a high level of mixing throughout the radiant box. This application describes a unique combustion scheme, termed opposed combustion, which satisfies these three criteria.

It is useful to consider the aerodynamics associated with an all-floor-fired pyrolysis furnace. With this combustion scheme, the aerodynamic pattern is basically unstable. A slight maldistribution of flow/firing rate from burner to burner can easily create severely leaning flames, significant flame impingement is frequently observed, and there is virtually no active mixing of the combustion gases in the top one-third of the radiant box. The reason for these problems is the relatively high gas recirculation rate together with the individual burner jets competing with each other to satisfy their mass entrainment requirements. These phenomena can also occur in wall/floor fired reactors.

By way of brief explanation of theory, one may consider a jet of gas as exerting a drag on the gas beside it, viz., the high velocity jet drags in or pulls in low velocity gas until the jet slows down also. When the element of combustion is added, this becomes a flaming gas. If the jet is confined by walls or neighboring jets, as in a furnace, the jet spreads until it interacts with those walls and jets. Then, since the jet still strives to entrain gas (mass entrainment requirement) recirculation occurs, in the region between the jet and the neighboring walls and jets, viz., the surrounding gas goes into the jet and comes out in the recirculation zone. When two jets are close, and pointed in the same direction, the line of symmetry between the jets is unstable. Even if the feed-rate of the fuel-fresh air mixture is kept constant the two jets compete for the same mass of gas, causing the instability mentioned above.

According to the present invention, the burner jets are arranged so that they cooperate rather than compete, with the mass entrainment requirement of the burner jets directed upward being largely satisfied by mass from the opposed burner jets directed downward, and vice versa. The result is the generation of strong vortices which are centered about each tube plane. These strong vortices ensure aerodynamic stability and a very high level of mixing along the entire length of the process tubes. Also, this aerodynamic pattern virtually eliminates any chance of flame impingement on the furnace tubes. Additionally, the flames or jets of combustion gases can be stretched a long distance this way, e.g., 25-40 feet, whereas in an all-floor-fired furnace the flame jets seldom extend more than 15 feet above the floor before the jet is dissipated. Opposed combustion thus offers the potential of optimizing heat release patterns throughout a reactor.

Thus, by the present invention, a flow pattern of combustion gases is established which takes the form of a vortex of combustion gases enveloping a row of vertical tubes, which is stable, avoids impingement of flames on the tubes and achieves uniform heating of the process tubes.

FIGS. 1 through 6 illustrate different applications of the concept of opposed combustion and will now be described in detail.

Figure 1:
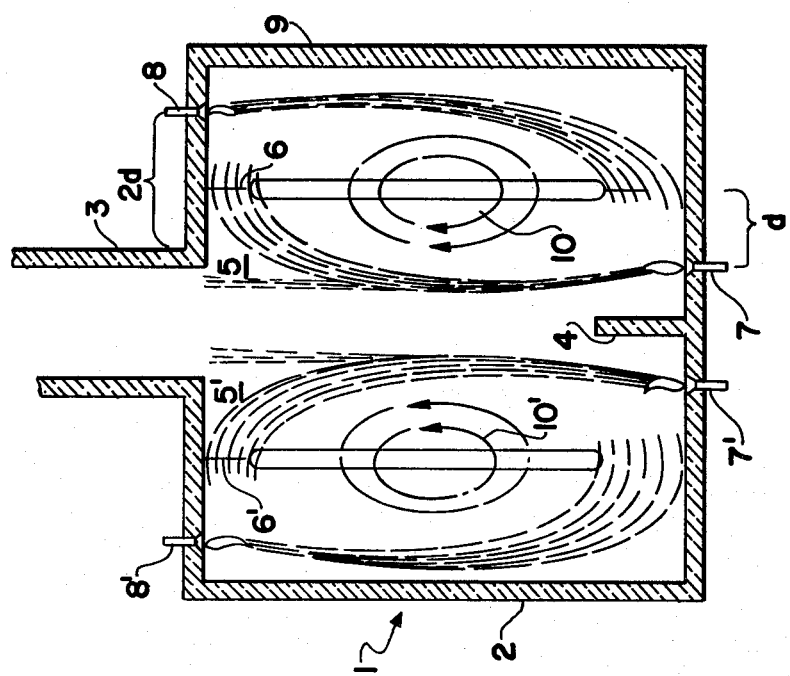
FIG. 1 is a schematic vertical sectional view of a furnace in which the burners fire vertically and are situated in the floor and in the roof; there are two adjacent cells with an optional baffle between which stabilizes the two vortices.

FIG. 1 shows in vertical section a furnace 1 comprising a radiant heating section or firebox 2 and a convection section 3 to which is connected a stack (not shown) for flue gases. An optional baffle 4 having a height which is at least about 10% of the combustion section height, divides the combustion section 2, defining the symmetry thereof, into two similar cells 5 and 5′. Referring to cell 5, a row of vertical, substantially parallel process tubes 6, one in back of the other, is located therein of which one is shown. Alternatively, a double staggered row may be used. FIG. 1a is a side view of FIG. 1 showing the row of tubes 6. The vertical tube plane is a plane cutting through the vertical axes of the tubes in the row. A row of floor burners 7 of which one is shown in FIG. 1 is located along one side of the vertical tube plane, essentially parallel to the tube plane, firing upwardly, and a row of roof burners 8 of which one is shown in FIG. 1 is located along the other side of said tube plane, essentially parallel to the tube plane, firing downwardly. The row of floor burners 7 is preferably placed as close as possible to the baffle 4 and the row of roof burners 8 is preferably placed adjacent to, and as close as possible to, the wall 9. Thus, they are as far as possible from the vertical tube plane. If d is the distance between the vertical tube plane and burners 7, 2d will suitably be the offset between burners 7 and 8. This illustrates opposed combustion in which the two sets of burners are firing in opposite directions but no row of burners is directly opposite any other opposed firing row; furthermore, the distance (horizontal in this instance) or offset, e.g., 2d, between the two opposed firing rows is sufficient to allow room for development of a strong vortex, shown at 10, of combustion gases enveloping the row of process tubes 6. The distance 2d or offset suitably is in the range of 4 to 10 feet, preferably 5 to 7 feet. The offset is typically 10 to 20% of the firebox height.

As another alternative, considering the two cells 5 and 5′, with no baffle being employed, a single row of centrally located floor burners could be used instead of the two burner rows 7 and 7′, to provide the functions thereof and thereby service both cells.

In operation, the manner in which the strong vortex forms is that the roof burner jets 8 direct downwardly a mass of combustion gas which is picked up by the floor burner jets 7 and satisfies their mass entrainment requirement; they in turn direct upwardly a mass of combustion gas which is picked up by the roof burner jets 8 and satisfies the latter's mass entrainment requirement. The gas recirculates in the vortex a number of times. A portion of gas in the vortex eventually leaves under the draft of the stack pulling the flue gases out of the furnace and a fresh portion of gas takes its place; this process goes on continuously. As shown in FIG. 1 illustrating vertical firing, the vortex has a stretched out, elongated shape which wraps around the row of vertical tubes 6, reaching up into the upper portion of the firebox also, thereby achieving uniform distribution of heat. The process being carried on in the tubes can be hydrocarbon pyrolysis with the feed being introduced thereinto as a gas or any other process requiring heat input including the boiling of water to make steam.

The existence of the vortex was verified by means of simulated tests carried out in a 1:25 scale model of a pyrolysis furnace in which water was employed as the fluid to model gas flows in the real furnace. Aluminum particles suspended in the water and dye injection were used to obtain visual/photographic observation of the aerodynamic patterns over a wide range of simulated operating conditions.

Figure 2:
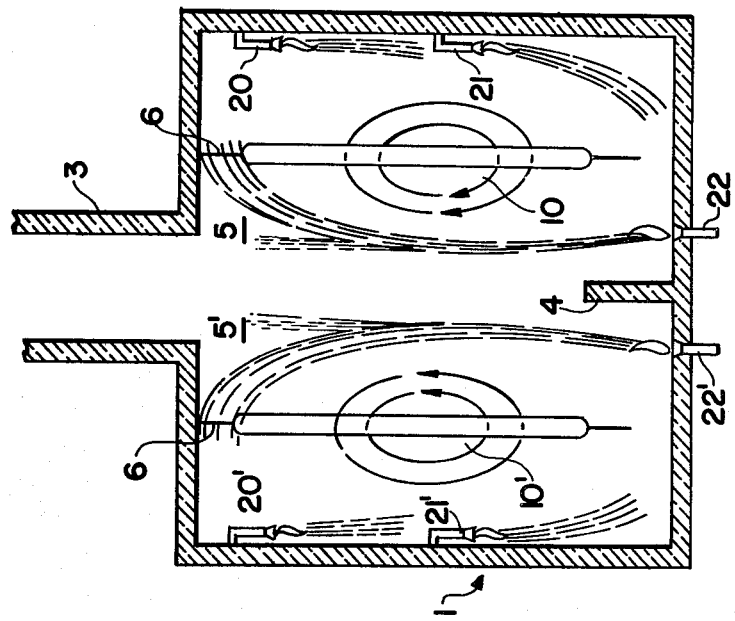
FIG. 2 is a schematic vertical sectional view of a furnace similar to the furnace of FIG. 1 except that instead of burners in the roof that fire vertically down, there are burners in the side walls that fire down.

FIG. 2 shows in vertical section a furnace having two cells in each of which a vortex is generated. Each of cells 5 and 5′ is heated respectively by a double row of side wall burners 20, 21 or 20′, 21′ (could alternatively be a single row at the top) firing downwardly and by a row of floor burners 22, 22′ firing upwardly. A forced vortex 10 is formed in cell 5 around a vertical row of tubes 6 circulating in a clockwise direction and a forced vortex 10′ is formed in cell 5′ around a vertical row of tubes 6′ circulating in a counterclockwise direction.

Figure 3C:
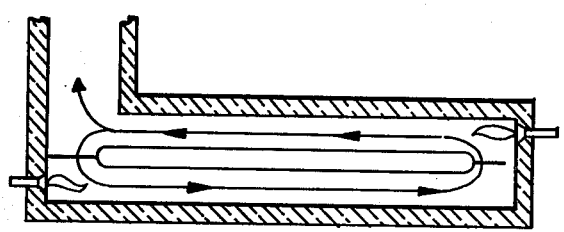
FIGS. 3a, b and c are schematic vertical sectional views of a furnace with a single radiant cell, the burners fire vertically and are situated in side walls, or alternatively in the floor and roof.
FIG. 3d shows how two cells can be arranged so that the flue gas goes to a common convection section.
Figure 3B:
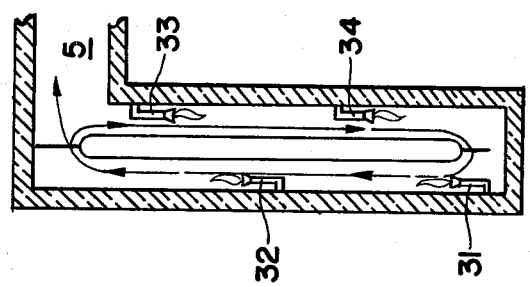
Figure 3A:
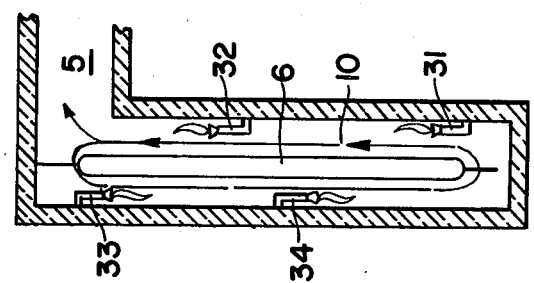
Figure 3D:
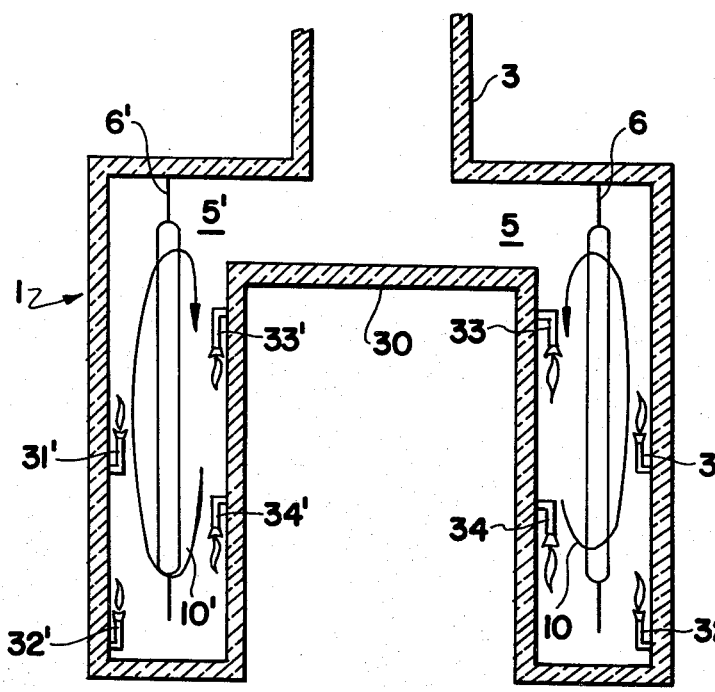

FIGS. 3a, b and c show in vertical section, furnaces having a single cell in which a vortex is generated. In FIGS. 3a and 3b the single cell 5 is heated by a double row of side wall burners 31, 32 firing upwardly and by a double row of side wall burners 33, 34 firing downwardly. In FIG. 3a, a forced vortex 10 is formed in cell 5 around a vertical row of tubes 6 circulating in a counterclockwise direction and in FIG. 3b the forced vortex is circulating clockwise. In FIG. 3c only one row of burners is used on each side of the tube plane. In FIG. 3d two cells are brought together in a common convection section 3. Each of cells 5 and 5′, separated by partition 30, is heated respectively by a double row of side wall burners 31, 32 and 31′, 32′ (could alternatively be a single row) firing upwardly and by a double row of side partition wall burners 33, 34 and 33′, 34′ firing downwardly. A forced vortex 10′ is formed in cell 5′ around a vertical row of tubes 6′ circulating in a clockwise direction and a forced vortex 10 is formed in cell 5 around a vertical row of tubes 6 circulating in a counterclockwise directon.

Figure 4:
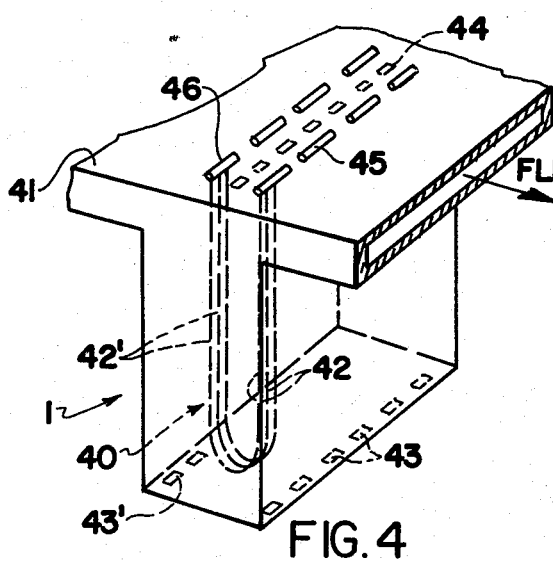
FIG. 4 is an isometric view of a furnace in which the furnace tubes are U-shaped, the burners fire vertically and are situated in the floor and on the roof; the total of the roof burners have a firing capacity equal to approximately the capacity of the floor burners.

FIG. 4 is an isometric view of a furnace 1 also employing vertical firing but in which the tubes comprise a vertical, substantially parallel row of U-shaped tubes 40 suspended from the roof 41 of the furnace. Each row or series 42, 42′ of vertical segments of the U-tubes defines a vertical tube plane. Rows of floor burners 43, 43′ firing upwardly are placed only at the walls whereas a row of roof burners 44 firing downwardly is located centrally between the branches or segments of the U-tubes. A single row of roof burners is generally sufficient particularly if in total they have the same firing capacity as the total of floor burners 43, 43′. In this illustration a single row of centrally located roof burners functions to supply heat to both series of vertical segments of the U-tubes, thus effecting the arrangement wherein a row of burners firing in one direction is located along one side of a vertical tube plane and another row of opposed firing burners is located along the other side of said tube plane. Feed is passed into the tubes via inlet manifolds 45 and exits through manifolds 46. In the case of a steam cracker converted product may exit into transfer line heat exchangers. Flue gas passes out in the direction indicated by the arrow, to a convection section (not shown). A clockwise vortex is generated around the series of vertical segments 42′ and a counterclockwise vortex is generated around the series of vertical segments 42. For simplicity they are not shown but are similar to ones shown in FIGS. 1 and 2.

Figure 5:
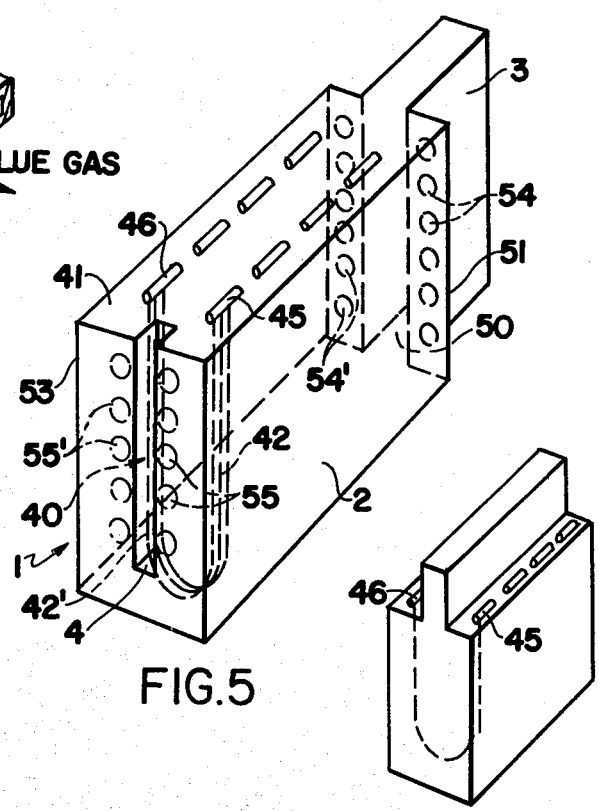
Figure 5A:
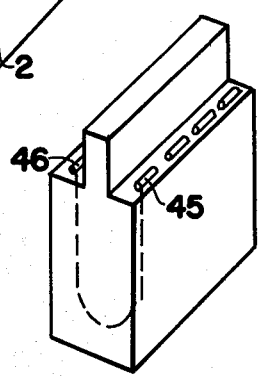

FIGS. 5 and 5a illustrate horizontal-firing burners.

FIG. 5 is an isometric view of a furnace 1 comprising a radiant heating section 2 in which the flue gas flows to a convection section 3 via an opening 50 in back wall 51. FIG. 5a only differs from FIG. 5 in that the flue gas exits from the top, between the tube rows. A baffle 4 centrally located in front wall 53 and extending some distance, divides the combustion section 2, defining the symmetry thereof, into two similar cells. The radiant tubes comprise a vertical, substantially parallel row of U-shaped tubes 40 suspended from the roof 41 of the radiant heating section 2. Each row or series 42, 42′ of vertical segments of the U-tubes defines a vertical tube plane. Rows of back burners 54, 54′ located at the sides of back wall 51 fire horizontally towards front wall 53. Centrally located rows of burners 55, 55′ on the sides of baffle 4 fire horizontally, in the direction of back wall 51 but it may be noted that no row of burners is directly opposite an opposed firing row. Alternatively the baffle may be omitted and only one row of central burners used. Furthermore, this illustrates the arrangement wherein there are two cells and, in each cell, a row of burners firing in one direction is located at one side of a vertical tube plane and another row of opposed firing burners is located at the other side of said tube plane. The opposed firing rows of burners are offset (in this instance horizontally) to allow room for the development of a vortex. Feed is passed into the tubes via inlet manifolds 45 and exits through manifolds 46. In the case of steam crackers converted product may be removed via transfer line heat exchangers. A clockwise vortex is formed around the series of vertical segments 42 and a counterclockwise vortex is formed around the series of vertical segments 42′, as viewed from the top of the furnace.

Although the tubes are vertically oriented and the burner jets and vortices are horizontally oriented, nevertheless each vortex wraps around and envelopes a row of vertical segments and, if these extend in a long line, it assumes an elliptical shape.

Figure 6:
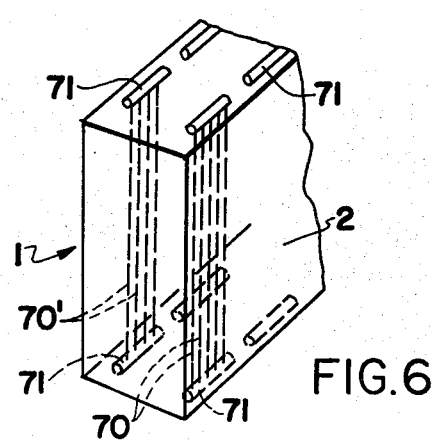
FIG. 6 is an isometric view of a furnace wherein the U-tubes of FIGS. 4 and 5 are replaced by two separate rows of once-through vertical tubes connected to inlet manifolds for the process stream; the burners may be arranged as in FIG. 4 or 5.

FIG. 6 illustrates another variation of the tubes in which two rows 70, 70′ of once-through vertical tubes are connected to feed inlet and outlet manifolds 71. In the case of a steam cracker, conversion product could be removed via transfer line heat exchangers. The tubes are adapted to be heated by the arrangement of burners shown in FIG. 4 or FIG. 5, so that there will be two cells.

By using the principle of opposed combustion described in this invention, stable vortices of combustion gases in a furnace with resulting uniform heating of process tubes can be achieved, thus improvement in life of metal tubes, yield and uniformity of product. In the steam cracking process one can achieve improvement in run length before decoking becomes necessary and higher selectivity to ethylene. The furnace box can be much narrower, thus saving construction costs. The furnace box, because of the length of the flames, can be taller than now possible with all-floor-fired burners. Thus the present combustion system increases the design flexibility of a furnace, i.e., one can make the firebox taller, longer and/or narrower.

What is claimed is:

1. A furnace comprising a radiant heating section in which there is at least one cell having a single or double row of vertical tubes defining a vertical tube plane, wherein there is a first row of burners on one side of the tube plane firing upwardly and a second row of burners on the other side of the tube plane firing downwardly and offset horizontally from said first row a sufficient distance to form a forced vortex of combustion gases around said tube plane, which is substantially elliptical and envelops said vertical tubes on both sides thereof, said elliptical vortex having a height of about 25 to 40 feet and a width of about 5 to 7 feet, no row of burners being located directly opposite an opposed firing row.

2. A furnace comprising a radiant heating section in which there is at least one cell having a single or double row of vertical tubes defining a vertical tube plane, wherein there is a first row of burners on one side of the tube plane firing in a first direction and a second row of burners on the other side of the tube plane firing in a second, opposite direction and offset from said first row a sufficient distance to form a forced vortex of combustion gases around said tube plane, said vortex surrounding said tubes on both sides thereof and being of substantially elliptical shape, no row of burners being located directly opposite an opposed firing row.

3. A furnace according to claim 2 in which the tubes are formed in serpentine fashion, the straight portions of which are vertical, with U-bends connecting the straight portions which form said single row of vertical tubes defining said vertical tube plane.

4. A furnace according to claim 2 in which there are one or more baffles, each being located between adjacent cells, in each of which cells a separate vortex is formed.

5. A furnace according to claim 2 which comprises a radiant heating section and a convection section.

6. A furnace as set forth in claim 2 in which there is no row of burners firing in other than said first and second directions.

7. A furnace comprising a radiant heating section in which there is at least one cell having a single or double row of vertical tubes defining a vertical tube plane, wherein there is a first row of burners on one side of the tube plane firing horizontally and a second row of burners on the other side of the tube plane firing horizontally in the opposite direction and offset horizontally from said first row a sufficient distance to form a forced vortex of combustion gases around said tube plane, which is of substantially elliptical shape and envelops said vertical tubes on both sides thereof, no row of burners being located directly opposite an opposed firing row.

8. A furnace according to claim 7 in which all of the burners are located in the opposite end walls of the furnace, a portion of them in one end wall and a portion of them in the opposite end wall.

9. A furnace according to claim 8 in which a convection section is located beside an end wall of the radiant heating section.

10. A furnace according to claim 7 in which two said rows of vertical, once-through tubes, each row forming a cell, are connected at the top and the bottom to separate manifolds or by common inlet and outlet manifolds, at least one row of horizontally firing, vertically spaced burners is located in a first end wall centrally of the tubes and rows of vertically spaced burners firing horizontally in the opposite direction are located in an opposite second end wall, adjacent to the side walls, thereby forming a vortex for each said row of tubes.

11. A furnace according to claim 2 or 7 in which the process carried on in said vertical tubes in steam cracking.

12. A furnace comprising a radiant heating section in which there is at least one cell having a single or double row of vertical tubes defining a vertical tube plane, wherein there is a first row of burners on one side of the tube plane firing upwardly and a second row of burners on the other side of the tube plane firing downwardly and offset horizontally from said first row a sufficient distance to form a forced vortex of combustion gases around said tube plane, which is of substantially elliptical shape and envelops said vertical tubes on both sides thereof to provide improved uniform heat distribution, no row of burners being located directly opposite an opposed firing row.

13. A furnace according to claim 12 comprising a partial baffle or baffles, each being located between adjacent cells, which are vertical floor baffles.

14. A furnace according to claim 12 or 13 in which, in each cell, said first row of burners is located in the floor and is firing upwardly and said second row of burners is located in the roof and is firing downwardly.

15. A furnace according to claim 14 in which the distance between the tube vertical plane and said first row of burners is d and the offset between said first and second row of burners is 2d.

16. A furnace according to claim 12 in which there are one or more partial partitions, each being located between adjacent cells, and, in each cell, said burners consist of one or more rows of wall burners on one side of said tube plane firing downwardly and one or more rows of wall burners on the other side of the said tube plane firing upwardly.

17. A furnace according to claim 12 or 13 in which, in each cell, said burners consist of one or more rows of wall burners on one side of said tube plane firing downwardly and a row of floor burners on the other side of said tube plane firing upwardly.

18. A furnace according to claim 12 in which each of said first row and second row of burners is located as far as possible from the vertical plane of said tubes.

19. A furnace according to claim 12 in which two said rows of vertical, once-through tubes, each row forming a cell, are connected at the top and bottom to separate or common inlet and outlet manifolds, a row of roof burners firing downwardly is located centrally between the rows of tubes, and a row of floor burners firing upwardly is located on each side of the tubes that faces away from the center thereby forming a vortex for each said row of tubes.

20. A furnace as set forth in claim 18 or 12 in which said rows of burners are respectively floor and roof burners and said horizontal offset is about 10 to 20% of the height of said radiant heating section.

21. A furnace as set forth in claim 12 in which said radiant heating section is of substantially rectangular shape.

22. A furnace as set forth in claim 1 in which the elliptical vortex has a height of about 25 to 40 feet and a width of about 7 feet to give a ratio of height to width of about 3 to 6:1.

23. A furnace as set forth in claim 12 in which the elliptical vortex has a ratio of height to width of about 3 to 6:1.

24. A furnace as set forth in claim 12 in which said vertical tubes are process tubes wherein steam cracking is being carried out.

25. A furnace comprising a radiant heating section having U-tubes, the straight segments of each U-tube being vertical with a U-bend connecting the straight segments, thereby forming two cells each having a row of segment vertical tubes defining a vertical tube plane, wherein for each tube plane: there is a first row of burners on one side of said tube plane firing in a first direction and a second row of burners on the other side of said tube plane firing in a second opposite direction and offset from said first row a sufficient distance to form a forced vortex of combustion gases around said tube plane, said vortex surrounding said tubes on both sides thereof and being of substantially elliptical shape, no row of burners being located directly opposite an opposed firing row.

26. A furnace according to claim 25 in which the array of said burners is comprised of a row of roof burners firing downwardly extending centrally of the U-tubes and a row of floor burners firing upwardly extending on each side of the U-tubes.

27. A furnace according to claim 25 in which a baffle extends centrally of the U-tubes, and the array of said burners is comprised of rows of horizontally firing, vertically spaced burners located in a first end wall, adjacent each side of the baffle, and rows of vertically spaced burners firing horizontally in the opposite direction located in an opposite second end wall, adjacent to the side walls.

* * * * *